United States Patent

Moskalik

[11] Patent Number: 5,853,208
[45] Date of Patent: Dec. 29, 1998

[54] MANUAL MANIPULATOR

[75] Inventor: Stephen L. Moskalik, Plainwell, Mich.

[73] Assignee: TDA Buddy, Inc., Kalamazoo, Mich.

[21] Appl. No.: 687,093

[22] Filed: Jun. 4, 1996

[51] Int. Cl.[6] .............................. B25J 1/04; B25J 13/02
[52] U.S. Cl. ........................ 294/19.1; 294/64.2; 294/88
[58] Field of Search .................. 294/11, 19.1, 22, 294/64.1, 64.2, 88, 106

[56] References Cited

U.S. PATENT DOCUMENTS

| | | | |
|---|---|---|---|
| 1,302,028 | 4/1919 | Fuchs et al. | 294/64.1 |
| 1,743,212 | 1/1930 | Harris | 294/64.2 |
| 1,757,529 | 5/1930 | Jones | 294/64.1 |
| 2,200,800 | 5/1940 | Miller | 294/64.2 |
| 2,280,658 | 4/1942 | Miller | 294/64.2 |
| 2,941,367 | 6/1960 | Schwab | 60/54.6 |
| 3,023,971 | 3/1962 | Milhous | 239/532 |
| 3,041,655 | 7/1962 | Entler | 15/600 |
| 3,071,402 | 1/1963 | Lasto et al. | 294/64.1 |
| 3,606,435 | 9/1971 | Weber | 294/70 |
| 3,912,317 | 10/1975 | Ohnaka | 294/64.2 X |
| 3,927,908 | 12/1975 | Knelson | 294/19 R |
| 4,079,978 | 3/1978 | McMullin | 294/19 R |
| 4,527,824 | 7/1985 | Rosenfeld | 294/64.1 |
| 4,615,555 | 10/1986 | Batehham | 294/19.1 |
| 4,647,094 | 3/1987 | Bergkvist et al. | 294/3 |
| 4,711,482 | 12/1987 | Brown et al. | 294/19.1 |
| 5,154,466 | 10/1992 | Neuhaus | 294/50.9 |
| 5,401,069 | 3/1995 | Swan | 294/1.1 |

FOREIGN PATENT DOCUMENTS 653 841   12/1962   Canada .

*Primary Examiner*—Johnny D. Cherry
*Attorney, Agent, or Firm*—Flynn, Thiel, Boutell & Tanis, P.C.

[57] ABSTRACT

A manual manipulator having a pneumatically operable tool for performing a tool function on a workpiece. An elongate hollow pole supplies the tool with pressurized gas from a remote supply. A housing containing the pneumatic control circuitry is located on the pole. A switch for selectively activating the pneumatic control circuitry is positioned near a handgrip on the pole, thereby allowing the operator of the manual manipulator to activate or deactivate the pneumatic control circuitry without removing the operator's hands from the manual manipulator. A second elongate hollow pole may be attached to the housing having a further grip thereon and containing the supply passageway of pressurized gas therein.

8 Claims, 7 Drawing Sheets

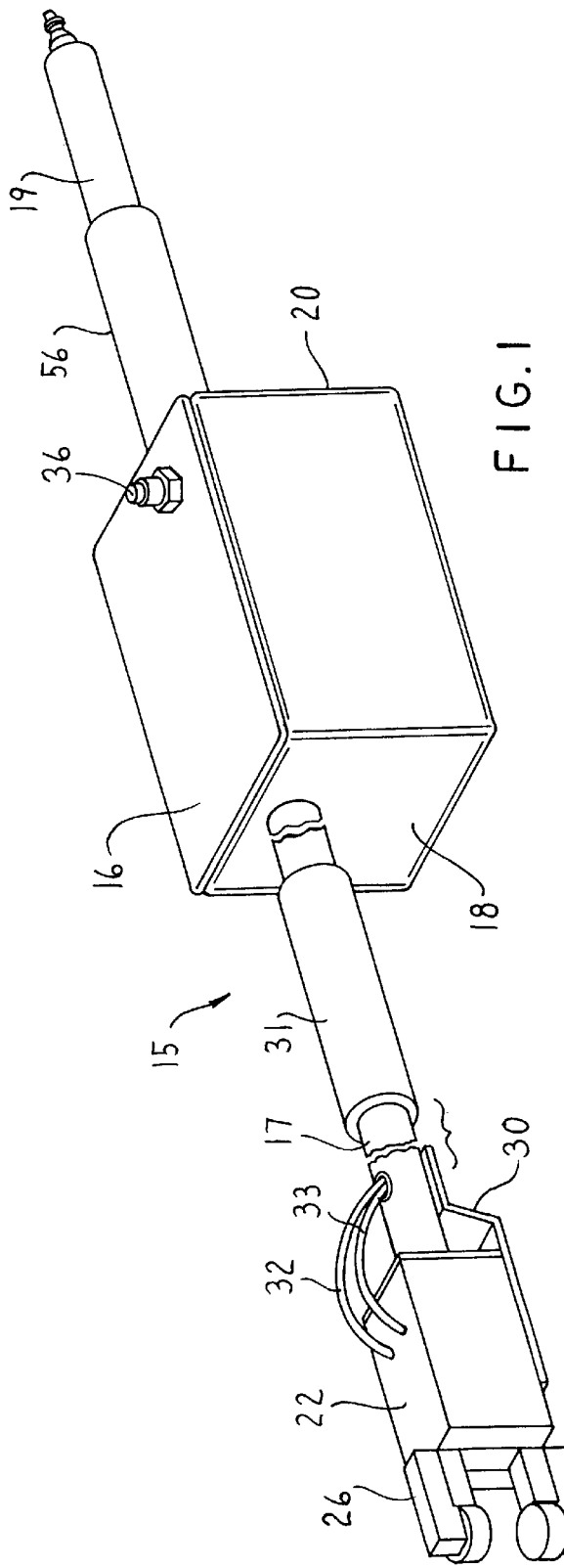
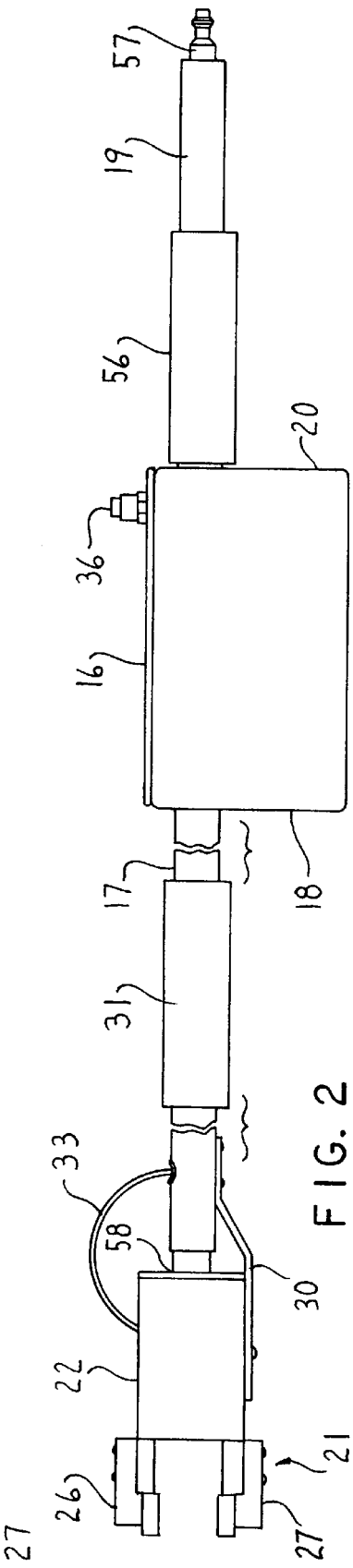

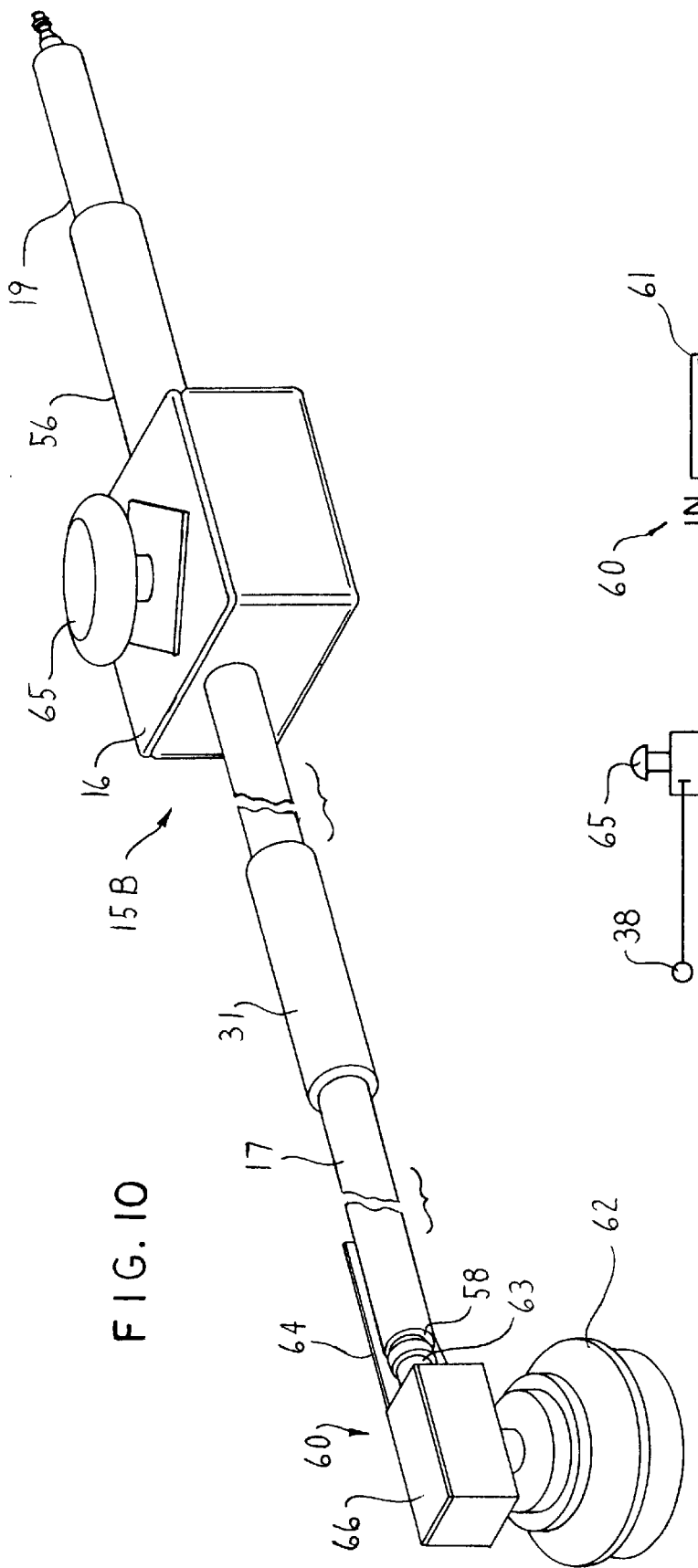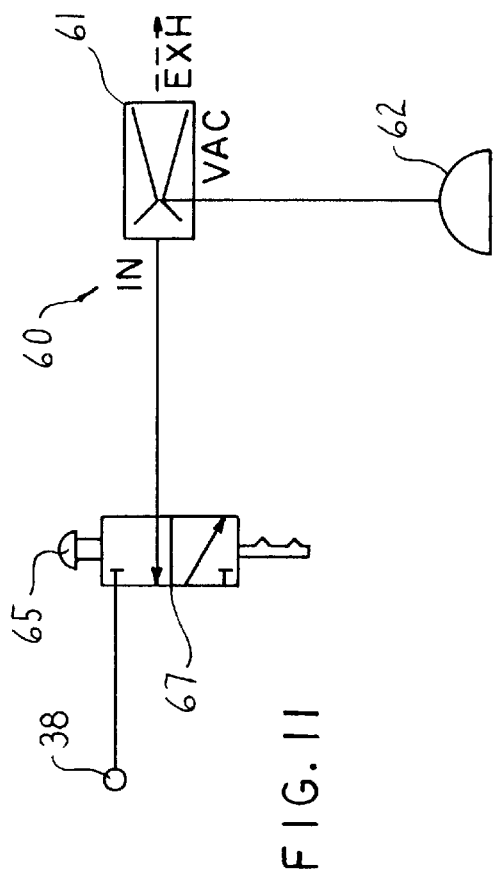
FIG. 10
FIG. 11

MANUAL MANIPULATOR

FIELD OF THE INVENTION

The present invention relates to a manual manipulator for grasping workpieces and, more particularly, to such a manual manipulator having a pneumatically powered grasping device thereon.

BACKGROUND OF THE INVENTION

Some known manual manipulators, of which I am aware, are elongate and have tools attached to a distal end operable by hydraulic pressure. These manual manipulators have simple on/off control valves at a near end receiving the pressurized hydraulic fluid or have no valves at all. The manual manipulators lacking valves rely on the remote hydraulic pressure supply unit to operate the tool. Therefore, to operate the tool, an operator must undesirably remove at least one hand and/or his attention from the manual manipulator. Inattentiveness to the job at hand reduces job safety, particularly when operating a manual manipulator around metal forming equipment, such as metal stamping presses.

Further, operators of metal presses have been known to enter a press between its stamping plates to retrieve items or remove stamped metals. Safety features preventing the accidental engagement of the press while operators are reaching into the press have improved worker safety; however, accidents still occur.

Other manual manipulators have control devices requiring constant gripping contact to operate the tool thereon. When using the manual manipulator to remove heavy objects, such as stamped metal, constant gripping of the control device fatigues the hand of the operator. Worker fatigue is another factor in work place accidents.

It is therefore an object of the present invention to provide a manual manipulator having a tool at one end and operable without necessitating removal of the operator's hands therefrom.

SUMMARY OF THE INVENTION

The objects and purposes of the invention, including those set forth above, are met by providing a manual manipulator which includes an elongate hollow pole with a tool arranged at one end and a housing containing the control circuitry with a manually operable switch.

BRIEF DESCRIPTION OF THE DRAWINGS

A preferred embodiment of the present invention is described in detail hereinafter with reference to the accompanying drawings, in which:

FIG. 1 is an isometric view of a manual manipulator which embodies the present invention;

FIG. 2 is a side view thereof;

FIG. 10 is an isometric view of a further embodiment of the manual manipulator;

FIG. 11 is a schematic diagram showing the pneumatic control circuitry for the modified manual manipulator of FIG. 10.

DETAIL DESCRIPTION

Figure 3:
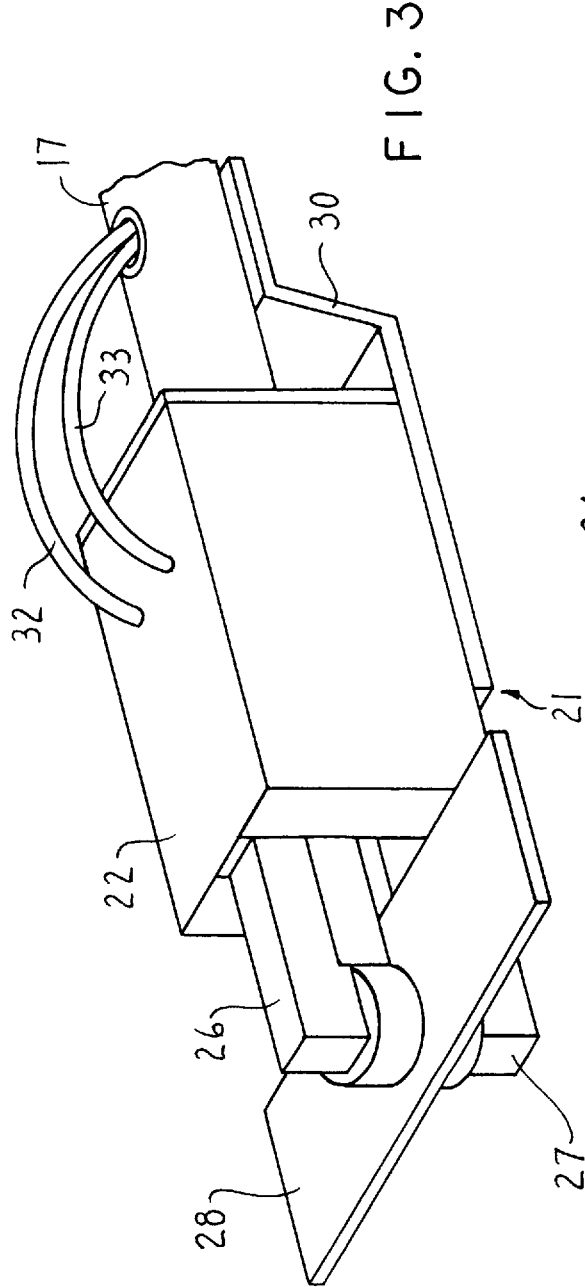
FIG. 3 is an enlarged isometric view of the tool on the manual manipulator.

FIG. 1 shows a first embodiment of a manual manipulator 15 having a box-like housing 16, a first elongate hollow pole 17 connected to and extending frontwardly from one side 18 of the housing 16 and a second elongate hollow pole 19 connected to and extending rearwardly from a further side 20 of the housing 16 remote from the side 18 thereof. The first elongate hollow pole 17 has a tool housing 22 attached to a distal end thereof remote from the housing 16. The tool housing 22 encloses a driving device for a jaw-like grasping implement 21, extending from the tool housing 22 such as a pneumatic piston-cylinder arrangement 23, 24, shown in FIG. 4, and a conventional transmission 25 for converting the movement of the piston-cylinder arrangement 23, 24 into an operable movement for the gripping implement 21. The driving device 23, 24 is drivingly connected to the upper jaw 26 and lower jaw 27 for effecting a relative movement, particularly toward one another to thereby grasp a workpiece 28 therebetween, as shown in FIG. 3, and utilizing, for example, a spring return to the releasing position. On the other hand, and if desired, the jaws can be power driven for separation as described in more detail below.

The attachment of the tool housing 22 to the distal end of the first hollow pole 17 is reinforced by a brace 30 so that some of the counter forces at the attachment between the first hollow pole 17 and the tool housing 22 are absorbed by the brace 30, particularly when manipulating workpieces 28 (FIG. 3) clamped between the jaws 26 and 27 of the jaw-like grasping implement 21. As a result, the brace 30 improves the durability and longevity of the manual manipulator 15.

The first hollow pole 17 can be of variable length and component material depending upon the specifications of the workpiece 28 and the working environment. For example, the first hollow pole 17 may be ½ inch schedule 40 aluminum pipe or other strong and light construction. Further, the brace 30 can also be modified to provide adequate reinforcement of the tool housing 22 and first hollow pole 17.

The first hollow pole 17 has a rigid or resiliently yieldable first handgrip 31 located thereon intermediate the housing 16 and the tool implement 21. The handgrip 31 may be constructed of rubber. The handgrip 31 is provided for facilitating a tight grip by the operator of the first hollow pole 17 of the manual manipulator 15.

The first hollow pole 17 may entirely enclose pneumatic passageways or lines 32 and 33 supplying air or a gas to operatively drive the jaw-like grasping implement 21. However, as shown in FIGS. 1–3, pneumatic passageways 32, 33 may only be partially enclosed within the first hollow pole 17. The pneumatic passageways 32 and 33 are mostly contained within the first hollow pole 17 to ensure that the pneumatic passageways do not become entangled with the operator's hand or with other equipment in the working environment, such as a metal press, thereby improving safety.

As stated above, the housing 16 is attached to the first hollow pole 17 and houses the pneumatic control circuit 34. The housing 16 is ideally lightweight, yet strong enough to protect the pneumatic circuitry 34 therein. It may be constructed, for example, from 10 gauge aluminum.

Figure 4:
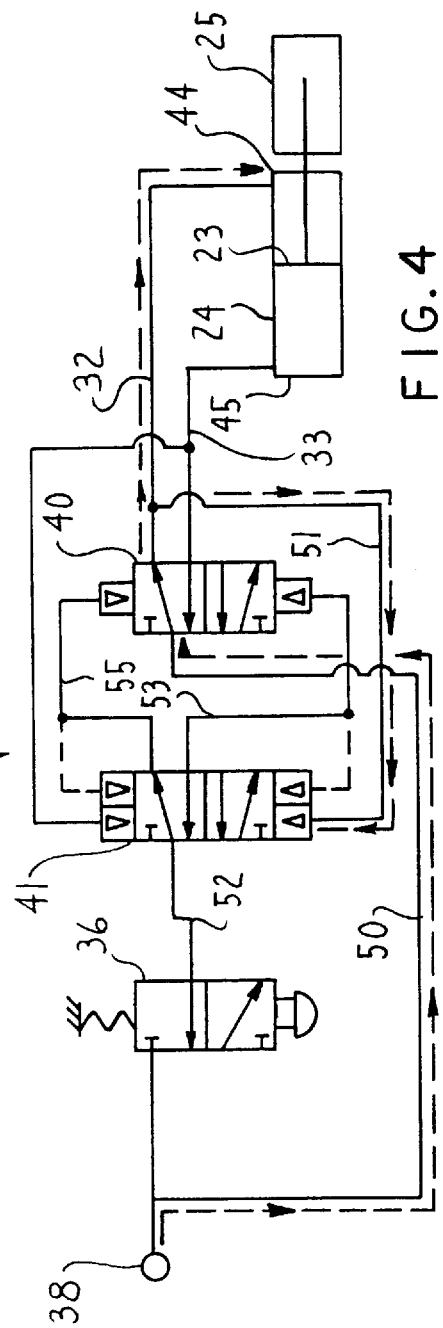
FIG. 4 is a schematic diagram of the pneumatic control circuitry in the manual manipulator showing the piston retreating into the cylinder.

The pneumatic control circuit 34, schematically illustrated in FIG. 4, supplies the jaw-like grasping tool 21 with pressurized air or gas to thereby effect a driving of the jaws 26 and 27 toward one another. An external, manually operated, switch 36 is positioned on the housing 16 to thereby activate the pneumatic control circuit 34. The pneumatic control circuit 34 includes a pressurized gas supply 38 connected to a 5-port 2-position drive valve 40 and connected through the switch 36 to a 5-port 2-position control valve 41 oriented within the housing 16. The switch 36 is a conventional push button that is spring returned and is shown as a 3-port 2-position valve. The switch 36 controls the flow of pressurized gas through the 5-port 2-position control valve 41, to select the position of a 5-port 2-position drive valve 40. The control valve 41 stays in its selected position until the feedback from the drive valve 40 forces the control valve 41 to change position as dictated by its prior position and the switch 36. In other words, the push button switch 36 is pushed to activate a grip of the jaws 26 and 27 and pushed again to effect a release of the jaws by changing the position of the valves 40, 41.

Figure 5:
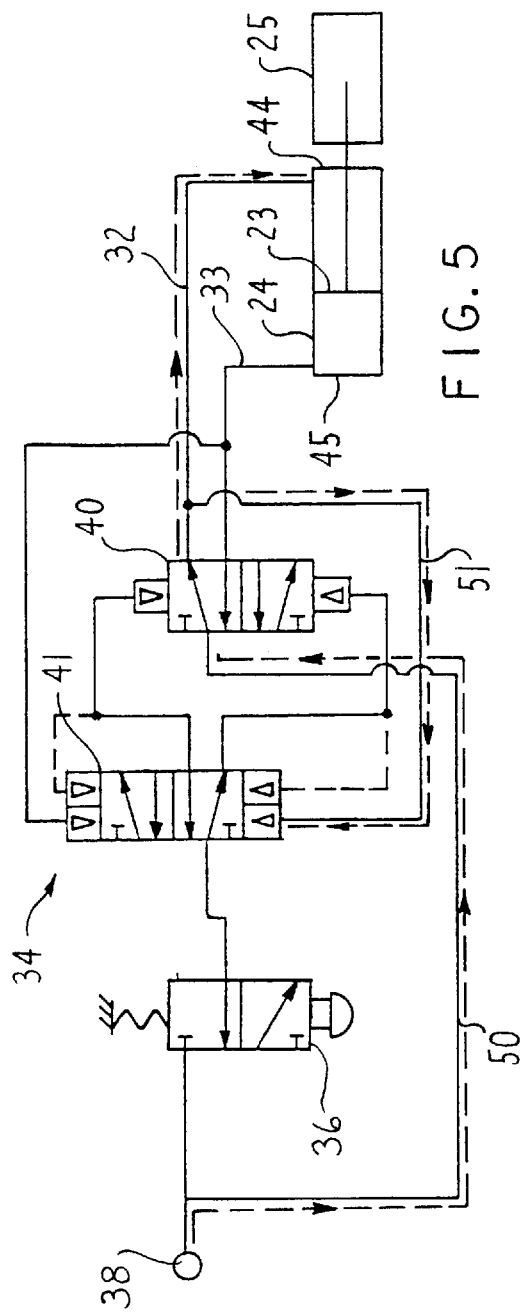
FIG. 5 is a diagram similar to FIG. 4, showing the circuitry when the piston is at rest fully within the cylinder.

The operational states of the pneumatic control circuitry 34 are shown in FIGS. 4–9. The activated or pressurized passageways are illustrated with additional dashed lines therebeside. FIG. 4 shows the state of the circuitry 34 driving the piston 23 from a first end 44 toward a second end 45 of the cylinder 24. The push button switch 36 is in its released or deactivated state. Pressurized gas or air from supply 38 is delivered via passageway 50 to the drive valve 40, here shown in its first position. The drive valve 40, in its first position, routes the pressurized gas to passageway 32 which is connected to the first end 44 of the cylinder 24 to drive the piston 23 toward the second end 45 of the cylinder 24. The piston 23 moving toward the second end of the cylinder 24 requires a vent for the gas (herein the term gas should be read as synonymous with air or gas) in passageway 33 and between the piston 23 and the second end 45 of the cylinder 24. The vent is provided in drive valve 40. Passageway 51 is a feedback line in communication between passageway 32, currently pressurized by supply 38 through drive valve 40, and control valve 41, here shown in its first position. Thus, as shown in FIG. 4, passageway 51 is pressurized and shifts control valve 41 to its second position while the piston 23 is driven toward the second end 45 of cylinder 24. The control valve 41 stays in its second position even after the piston 23 has reached the second end 45 of the cylinder 24 (FIG. 5).

Figure 6:
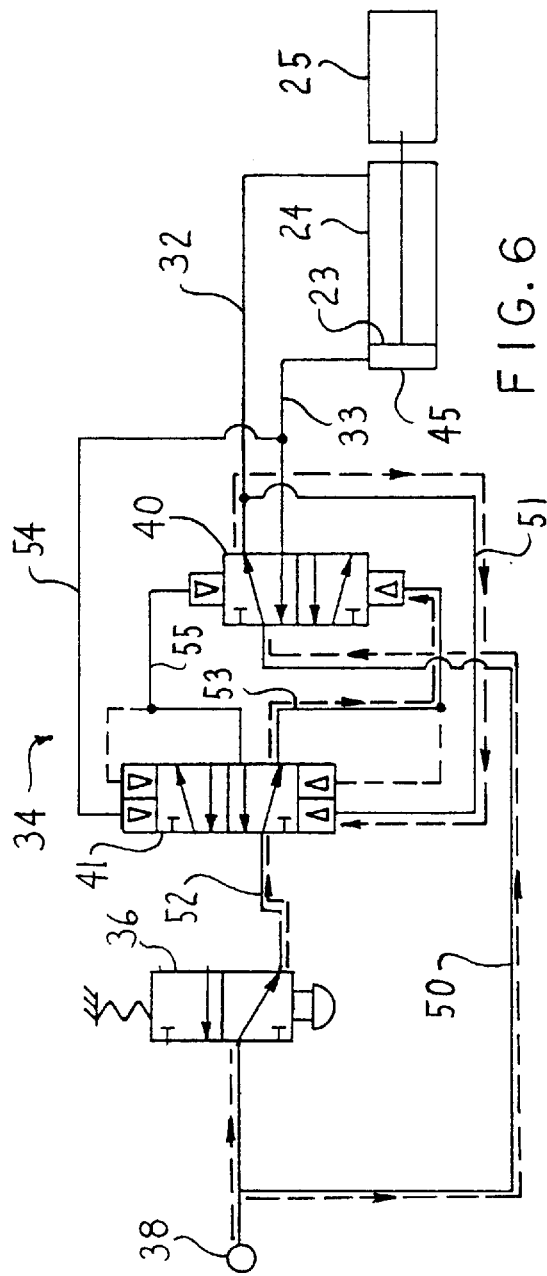
FIG. 6 is a diagram similar to FIG. 5, showing the circuitry when triggering the circuitry to move the piston out of the cylinder.
Figure 7:
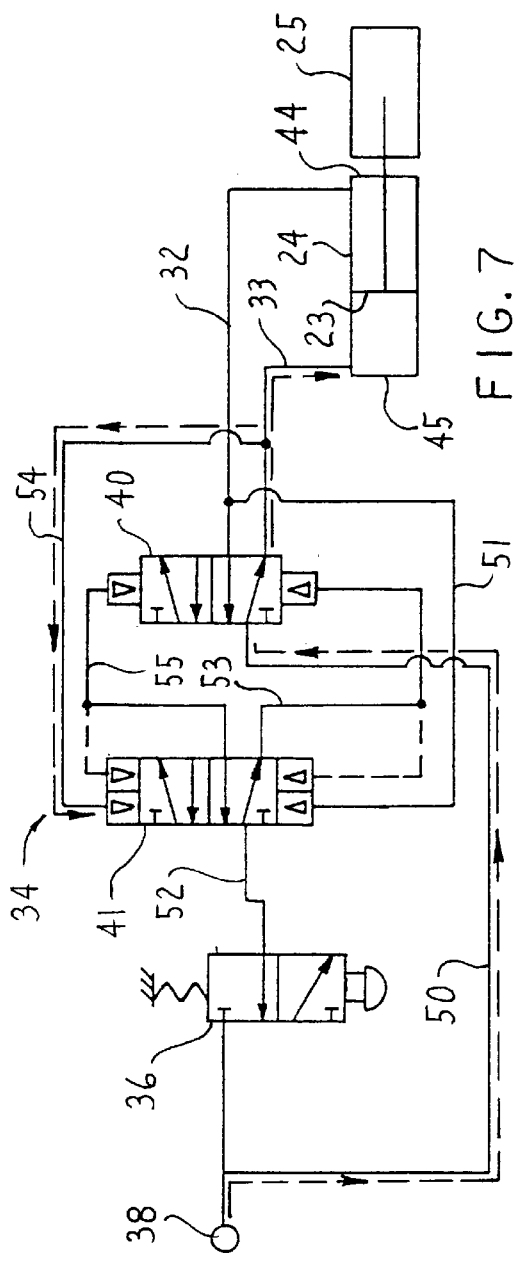
FIG. 7 is a diagram similar to FIG. 6, showing the circuitry when the piston is moving out of the cylinder.

FIG. 6 shows the circuitry 34 when the switch 36 is activated to thereby change the state of the grasping implement 31. As discussed above, passageway 51 is still pressurized and holding control valve 41 in its second position. With switch 36 activated and control valve 41 in its second position, pressurized gas flows through passageways 52, 53 and changes drive valve 40 to its second position (FIG. 7). As a result of drive valve 40 being in its second position, the pressurized gas in passageway 50 from supply 38 flows into passageway 33 and thus into cylinder 24 driving the piston 23 toward the first end 44 of the cylinder 24. The piston 23 moves toward the first end 44 of cylinder 24, and requires a vent for the gas contained in both the passageway 32 and in the cylinder 24 between the piston 23 and first end 44 of the cylinder 24. The operator may now release the switch 36 back into its deactivated rest position, and the piston 23, will continue to travel toward the first end 44.

Figure 8:
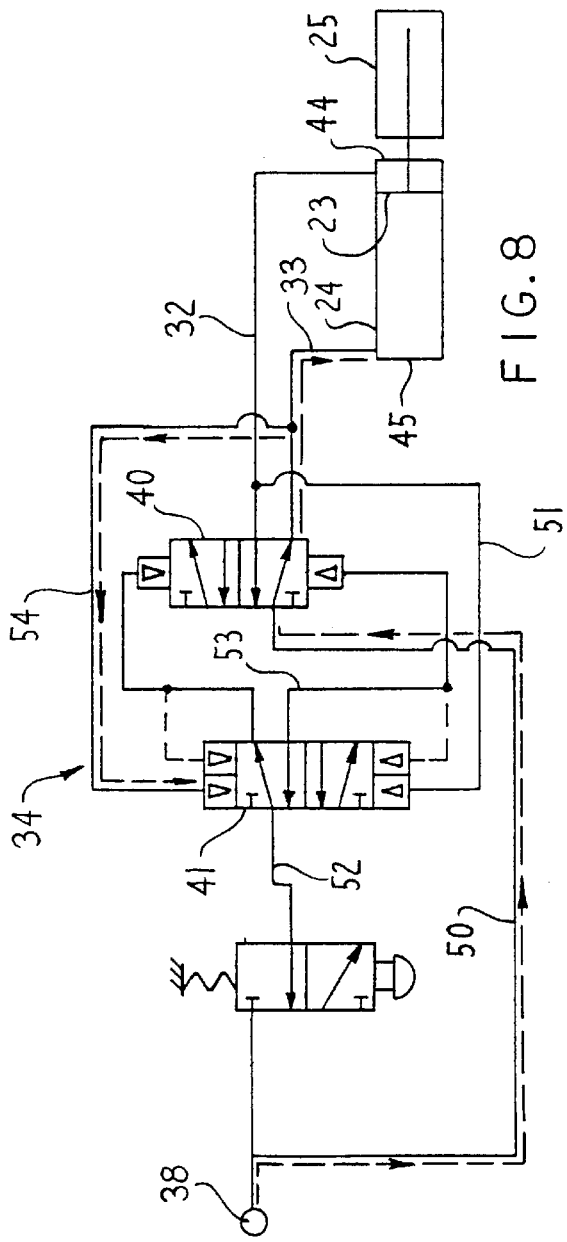
FIG. 8 is a diagram similar to FIG. 7, showing the piston is at rest fully extended from the cylinder.

While the piston 23 travels toward the first end 44 of the cylinder 24, pressurized gas is fed through passageway 54 forcing the control valve 41 back into its first position (FIG. 8).

Figure 9:
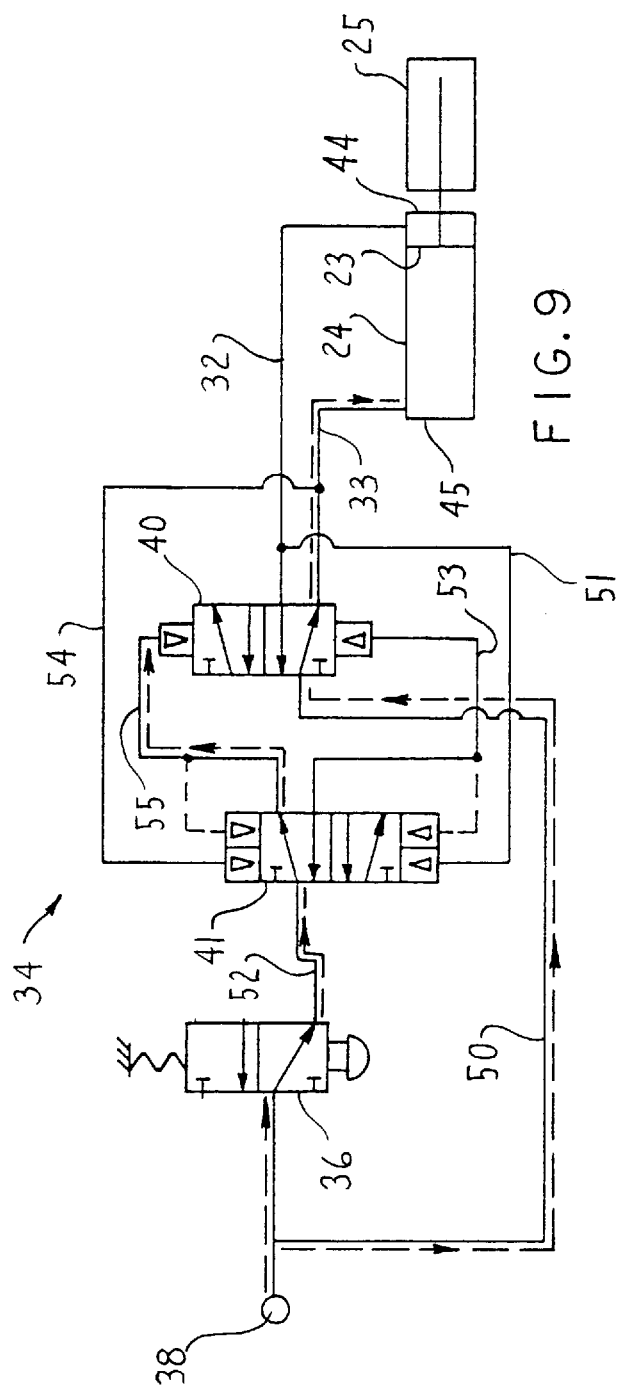
FIG. 9 is a diagram similar to FIGS. 4 and 8, showing the circuitry when triggering the circuitry to move the piston into the cylinder.

Once it is desired to drive the piston 23 toward the second end 45 of the cylinder 24, the switch 36 is activated by the operator (FIG. 9). Pressurized gas from supply 38 flows through switch 36 into passageway 52. Control valve 41 is in its first position and thus routes the pressurized gas to passageway 55. Passageway 55 communicates with the drive valve 40 and forces it to its first position. The operator now releases the switch 36 and the circuit 34 is in the state illustrated in FIG. 4 thereby driving the piston 23 toward the second end 45 of the cylinder 24.

As stated above, the second elongate hollow pole 19 is attached to the side 20 of the housing 16. The second elongate hollow pole 19 has a rigid or resiliently yieldable handgrip 56 located thereon intermediate the housing 16 and a distal end of the second hollow pole 19. The provision of the second hollow pole 19 to the manual manipulator 15 allows the housing 16 and the control switch 36 to be generally centrally located on the manual manipulator or offset from the center near side 20 of housing 16 toward the second hollow pole 19. The second hollow pole 19 additionally allows the operator to utilize the two separate handgrips 31, 56 to stabilize the manual manipulator 15. This enables the operator to easily handle heavy and/or large workpieces shown at 28 (FIG. 3).

The switch 36, here a push button switch, should be placed to allow a finger or thumb of an operator's hand to engage and operate the switch 36 without the operator's hands becoming separated from the grips 31 and 56. As illustrated, the switch 36 is near the rear grip 56 which is positioned on the second hollow pole 19. As shown, the switch 36 on the housing 16 is offset toward one edge of the housing 16. The offsetting of the switch 36 allows the operator to depress the switch with a finger or a thumb on the hand holding the rear grip 56, without necessitating a release of the operator's hands from either one of the handgrips 31 and 56.

In the preferred embodiment, the second hollow pole 19 also serves as a conduit for supplying the pressurized air or gas to the pneumatic control circuit 34 from the remote pressurized gas supply 38. A standard quick connect air fitting 57 is positioned at the distal end of the second hollow pole 19 to allow connection to a pressurized gas supply hose, not shown, from the remote pressurized gas supply 38. By placing the passageway in the interior of the second hollow pole 19 to supply the pressurized air or gas to the pneumatic control circuit 34 inside of the housing 16, there are no pneumatic hoses that may entangle the operator or other equipment. All hoses and the like would be oriented rearwardly of the operator and the manual manipulator 15.

Figure 12:
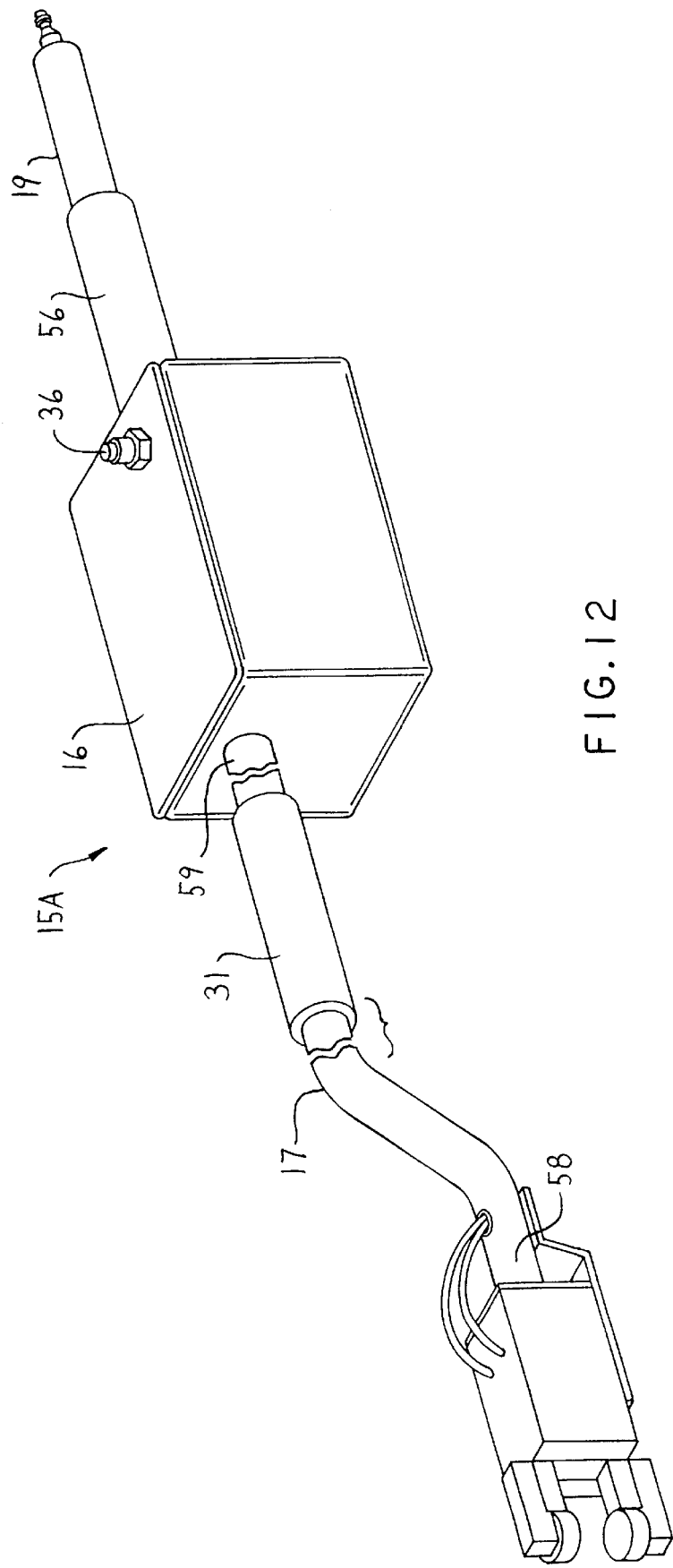
FIG. 12 is a pole modification for the manual manipulator of FIG. 1 (also FIG. 10).

Depending upon the working environment of the manual manipulator 15, it may be desirable to alter the shape of the elongate hollow poles 17, 19. FIG. 12 illustrates a desired configuration of a modified manual manipulator 15A, namely, bending the first hollow pole 17 to thereby displace the tool end 58 to a radially offset relation with respect to the housing end 59 thereof. This will improve the operability and control of the manual manipulator 15A in certain working conditions. Further modifications of the shape of the poles 17, 19 are deemed to be within the scope of this invention.

A third embodiment of the manual manipulator 15B is illustrated in FIG. 10. A venturi-principal tool 60 is attached to the tool end 58 of the front hollow pole 17. The venturi-principal tool 60 has a venturi vacuum pump 61 and a venturi cup 62 connected thereto. The venturi vacuum pump 61 creates the vacuum necessary for a suction force created thereby to draw a workpiece (not shown) to the venturi cup 62. The venturi-principal tool 60 is attached to the first hollow pole 17 through a reducer fitting 63, which attachment is reinforced by a supporting bracket 64 secured to and extending between the tool end 58 and venturi tool housing 66 for the pump 61. The supporting bracket 64 reinforces the venturi-principal tool 60 on the end 58 of the first hollow pole 17. Reducer fitting 63 provides proper pressurized gas flow to the venturi vacuum pump 61. Thus, the tool implement 60 of the third embodiment of the manual manipulator 15B has fewer moving parts than the primary embodiment.

The pneumatic schematic diagram of the third embodiment of the manual manipulator 15B is based upon the well known venturi vacuum principal, which is schematically illustrated in FIG. 11. A pneumatic pressurized air or gas supply 38 is connected to a pneumatic, push button operated switch 65. The switch 65 selectively supplies the venturi vacuum pump 61 with pressurized gas to create the vacuum necessary to grip workpieces by the venturi cup 62. The switch 65 is a conventional push to activate 3-port 2-position switch valve 67. Once activated, the switch position remains unchanged until the push button is again activated. The venturi vacuum pump 61 is an off-the-shelf item, such as the venturi vacuum pump available from CPI of Charlevoix, Mich., model VMA 312.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A manual manipulator, comprising:
   an elongate hollow pole of finite length thereby defining opposite first and second ends, said pole having a first grip means thereon for facilitating a manual carrying of said pole by at least one hand of an operator;
   a housing means on said pole and adjacent said first grip means;
   a first passageway means for providing communication between a remote pressurized gas supply and an interior of said housing means;
   a pneumatically operable tool connected to said pole adjacent said second end and undergoing a tool function in response to a supply of pressurized gas thereto;
   a second passageway means for providing communication between an interior of said housing means and said tool;
   a pneumatically operated control means disposed in said interior of said housing means for regulating a flow of pressurized gas from said first passageway means to said second passageway means and thence to said tool, said control means including a selectively manually operable switch for selectively activating and deactivating the supply of pressurized gas to said tool, said control means being configured for operation in response to a first manual activation of said switch to activate said flow of pressurized gas and maintain said flow of pressurized gas after said first manual activation is completed so that said flow of pressurized gas can be maintained when the hand of the operator is disengaged from said switch to enable the operator to continuously maintain stability of said manual manipulator, said control means being additionally configured for operation in response to a second manual activation of said switch to deactivate said flow of pressurized gas and to maintain said flow of pressurized gas deactivated after said second manual activation is completed, said switch being provided on at least one of said pole and said housing means and positionally adjacent said first grip means so that said switch can be activated by the operator without the hand of the operator becoming disengaged from said first grip means to thereby enable the operator to continuously maintain stability of said manual manipulator; and wherein said pole includes separate, elongate and axially aligned first and second elongate pole sections, said first pole section having said first end at one end and connected to said housing means at an other end thereof, said second pole section having said second end at one end and connected to said housing means at an other end thereof, said first pole section having said first grip means thereon, and said first passageway means extending therethrough, said second pole section having a second grip means thereon for facilitating a manual carrying of said pole by an other hand of the operator and said second passageway means extending therethrough, said housing means being located intermediate said first and second grip means such that said first grip means is spaced apart from said second grip means and one hand of the operator is engaged with said first grip means and another hand of the operator is engaged with said second grip means such that as said manual manipulator is moved in a horizontal plane the stability of said manual manipulator is maintained.

2. The manual manipulator according to claim 1, wherein said selectively manually operable switch is provided on said housing means adjacent said first grip means so that said selectively operable switch can be activated by the operator without a hand of the operator becoming disengaged from said first grip means to thereby enable the operator to continuously maintain stability of said manual manipulator by both hands.

3. The manual manipulator according to claim 1, further comprising a quick connect gas fitting means for connecting a gas hose from said remote pressurized gas supply to said first passageway means, said gas fitting means being provided on said first end of said first pole section.

4. The manual manipulator according to claim 1, wherein said pneumatically operable tool is a jaw with a means for driving said jaw to grasp a workpiece in response to the supply of pressurized gas from said control means through said second passageway means.

5. The manual manipulator according to claim 4, wherein said second passageway means has a first pneumatic line from said control means to said means for driving said jaw to an open position and a second pneumatic line from said control means for driving said jaw to a closed position.

6. The manual manipulator according to claim 1, wherein the pneumatically operable tool is a venturi principle suction cup, said venturi principle suction cup directly utilizes the supply of pressurized gas from said second passageway means to grasp workpieces by vacuum to said cup.

7. The manual manipulator according to claim 1, wherein said elongate hollow pole is bent in a region between said housing means and said tool so as to define offset first and second segments, a longitudinal axis of said first segment being longitudinally parallel to and radially offset from a longitudinal axis of said second segment.

8. The manual manipulator according to claim 1, wherein said pneumatically operated control means includes a 2-position, 3-port pneumatic valve and at least two 2-position, 5-port pneumatic valves operatively connected to each other between said first passageway means and said second passageway means.

* * * * *